Figure 1:
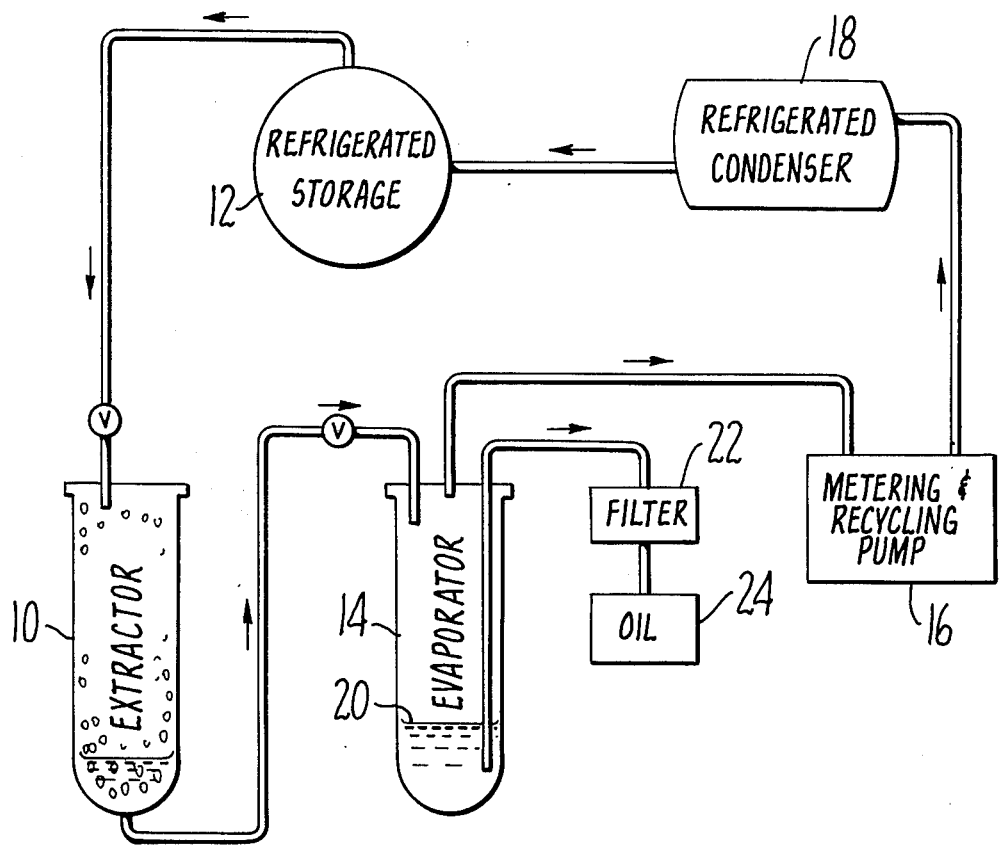

United States Patent [19]

Maffei

[11] 4,012,194
[45] Mar. 15, 1977

[54] EXTRACTION AND CLEANING PROCESSES

[76] Inventor: Raymond L. Maffei, 639 Front St., San Francisco, Calif. 94111

[22] Filed: Aug. 2, 1973

[21] Appl. No.: 384,908

Related U.S. Application Data

[63] Continuation of Ser. No. 186,089, Oct. 4, 1971, abandoned.

[52] U.S. Cl. ................................................ 8/142
[51] Int. Cl.$^2$ ........................................ D06L 1/02
[58] Field of Search .......... 8/137, 137.5, 138, 139, 8/139.1, 142; 68/18 L; 252/364

[56] References Cited
UNITED STATES PATENTS

| | | | |
|---|---|---|---|
| 1,197,495 | 9/1916 | Jefferson | 8/139.1 |
| 1,805,751 | 5/1931 | Auerbach | 208/177 |

Primary Examiner—Stephen C. Bentley
Attorney, Agent, or Firm—Naylor, Neal & Uilkema

[57] ABSTRACT

Extraction and cleaning processes characterized by the use of liquid carbon dioxide as the extraction and cleaning solvent. This solvent is disclosed as being applied to plant material for the extraction of essential oils and as being used in place of the conventional solvents in the dry cleaning of garments.

1 Claim, 2 Drawing Figures

INVENTOR.
RAYMOND L. MAFFEI
BY Naylor & Neal
ATTORNEYS

EXTRACTION AND CLEANING PROCESSES

This application is a continuation of my copending application, Ser. No. 186,089, filed Oct. 4, 1971, now abandoned.

Among the objects and advantages of the invention are the following: the extraction of essential oils in one simple operation without harm to the oils and without leaving a toxic residue; the provision of a novel, non-toxic, non-inflammable solvent for the cleaning of a wide variety of objects, including the dry cleaning of garments.

Figure 2:
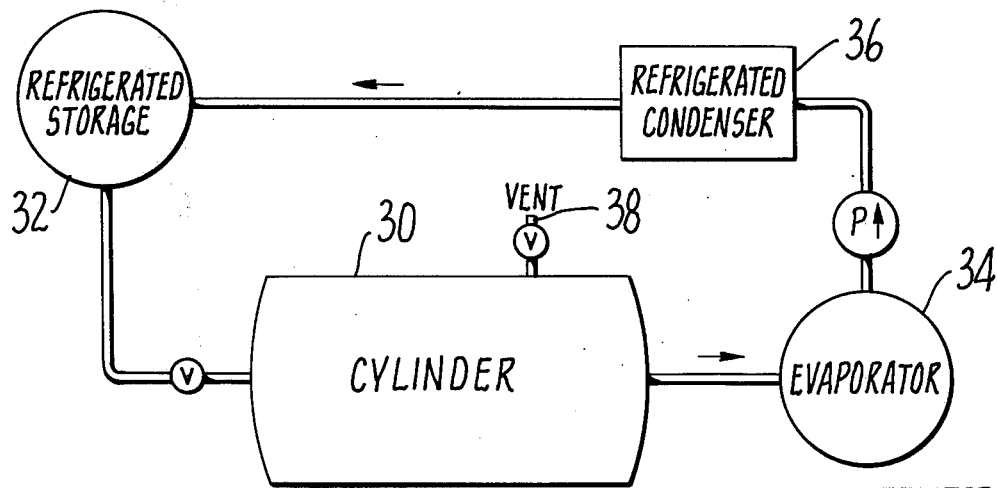

These and other objects and advantages of the invention will be apparent from the following description taken in conjunction with the drawing forming part of this specification, and in which:

FIG. 1 is a flow diagram of the essential oil extraction process of the invention; and FIG. 2 is a flow diagram of the garment dry cleaning process of the invention.

With reference to FIG. 1, ground plant material is placed in extractor 10; liquid carbon dioxide is passed from storage unit 12 to the extractor; liquid carbon dioxide containing the essential oils from the plant material goes to the evaporator 14; gaseous carbon dioxide passes through the pump 16 to condenser 18; liquid carbon dioxide passes from condenser 18 to the refrigerated storage unit 12; and the essential oil 20, non-oxidized because of extraction in a reduction atmosphere, is passed through filter 22 to collector 24 in a condition for ultimate use. The cycling of the carbon dioxide through the system is continued until all of the essential oil has been extracted from the plant material in extractor 10.

With reference to FIG. 2, garments or other objects to be cleaned are placed within the cylinder 30; liquid carbon dioxide is admitted to the cylinder from refrigerated storage tank 32 and passed through the garments; the liquid carbon dioxide is then transferred to evaporator 34; gaseous carbon dioxide is passed through condenser 36 to refrigerated storage unit 32; and after recovery of the main body of gaseous carbon dioxide from cylinder 30, as by cryogenic condensation, the small amount of vapor left is vented to atmosphere through vent line 38.

Inasmuch as drying of the clean garments is unnecessary, the FIG. 2 equipment is considerably simpler than that conventionally employed in garment dry cleaning systems. Unlike the latter, the system of FIG. 2 does not require the presence of a heater or a fan.

In order to be acceptable, a dry cleaning solvent must meet the following requirements:

1. It must not weaken, dissolve, or shrink the ordinary textile fibers.
2. It must not bleed the common dyes from fibers.
3. It must be a satisfactory solvent for fats and oils.
4. It must not impart any objectionable odor to the dry cleaned garments.
5. It should be sufficiently volatile to permit reclamation by distillation and to permit the garments to be dried without prolonged heating at excessive temperatures.
6. It must be non-corrosive to metals.
7. It must be relatively non-toxic.
8. It must be non-inflammable or otherwise comply with fire regulations.

The most common dry cleaning solvents in use at the present time are Stoddard solvent and perchloroethylene. These have been considered acceptable with reference to the above-listed standards, but they are compromises at best in terms of residual odor, excessive drying temperature, length of drying time, and solvent loss. In 1955 in the United States, approximately 153 mission gallons of Stoddard solvent and perchloroethylene were employed by dry cleaners. If this amount is to be considered as make-up solvent, then it is obvious that these conventional solvents contribute to air pollution. On the other hand, the discharge to atmosphere of the residual gaseous carbon dioxide in the present process constitutes no complicating factor at all with reference to air pollution. Furthermore, I have established that liquid carbon dioxide is superior to these conventional dry cleaning solvents with respect to each of the eight tests or conditions listed above.

What is claimed is:

1. A garment cleaning process consisting essentially of passing liquid carbon dioxide through garments to be cleaned by placing the garments within a closed container and admitting liquid carbon dioxide into the container from a refrigerated storage container, transferring the liquid carbon dioxide from the container to an evaporator, removing the dissolved garment soil material from the carbon dioxide by converting the liquid carbon dioxide to gaseous carbon dioxide in the evaporator, collecting the garment soil material in the evaporator and discarding it, and transferring carbon dioxide from the evaporator to a refrigerated condenser and then to the refrigerated storage container.

* * * * *